G. KAPP.
MEANS FOR TESTING THE DURABILITY OF MATERIAL WHICH IS EXPOSED TO REPEATEDLY APPLIED STRESSES.
APPLICATION FILED OCT. 14, 1911.
1,062,595.
Patented May 27, 1913.
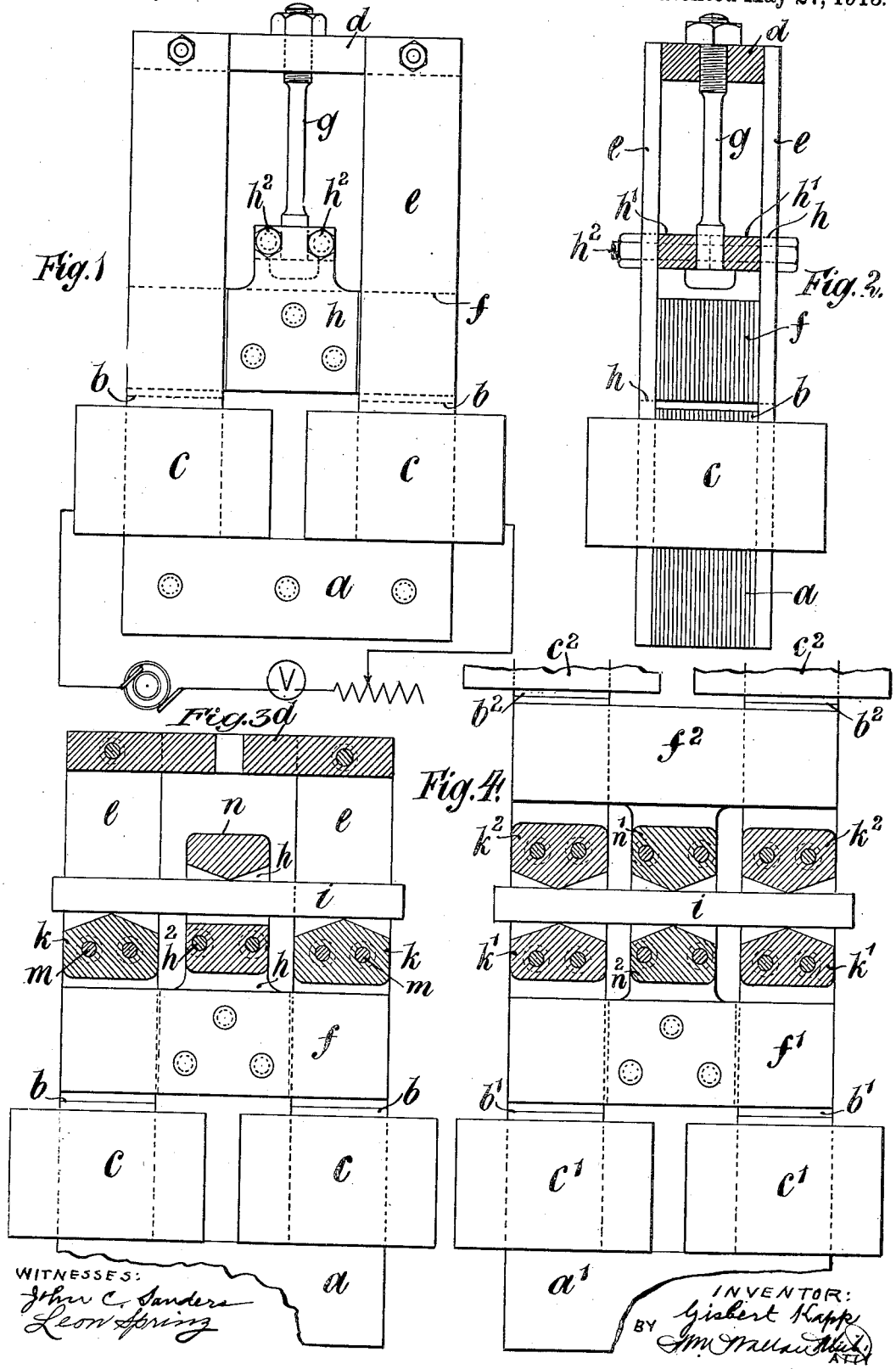

UNITED STATES PATENT OFFICE.

GISBERT KAPP, OF BIRMINGHAM, ENGLAND.

MEANS FOR TESTING THE DURABILITY OF MATERIAL WHICH IS EXPOSED TO REPEATEDLY-APPLIED STRESSES.

1,062,595.  Specification of Letters Patent.  Patented May 27, 1913.

Application filed October 14, 1911. Serial No. 654,617.

*To all whom it may concern:*

Be it known that I, GISBERT KAPP, subject of the King of Great Britain, residing at Pen-Y-Coed, Pritchatts Road, Edgbaston, Birmingham, England, have invented new and useful Improvements in Means for Testing the Durability of Material Which is Exposed to Repeatedly-Applied Stresses, of which the following is a specification.

This invention relates to improvements in means for testing the durability of material which is exposed to repeatedly applied stresses. In the contrivances which have hitherto been employed for this purpose, the conditions have been such as to preclude a very high frequency of repetition of stress, causing the process of ascertaining the measure of the strength of the material to withstand unlimited repetition of a like stress to be very prolonged and tedious.

By the present invention, in which the stress is due to the application of a magnetically produced force derived by an alternating electric current I am able to raise the frequency of the application of the stress to such a degree as to render the length of time occupied in the experiment only a small fraction of that hitherto necessary, while, at the same time, the stresses which, in the systems of operation hitherto employed, are due to change of momentum of the moving parts of the apparatus, are almost entirely eliminated. Moreover, by varying the frequency and the E. M. F. of the alternating current I am able to vary the intensity of the stress applied and obtain a precise indication thereof by a voltmeter which can be calibrated to indicate directly the stress or load applied.

An alternating current sent through the winding of an electro-magnet produces a maximum induction alternated by zero induction twice in each period. The armature of such a magnet is therefore attracted with a maximum force twice in each complete period and at intermediate times there is no attractive force. If the armature is so connected to a test piece as to cause the latter to be strained by the said attractive force, the test piece will be subjected to a stress varying between zero and a maximum twice in each period. With a current of 50 frequency for example, the test piece will be subjected to 100 stresses a second, or over a million in three hours. I mention the frequency of 50 only by way of example; any other frequency may be used, provided it is not so high as to produce resonance with the natural frequency of vibration of the test piece and the mass of the armature attached thereto. With test pieces less than a foot long and the minimum mass of armature requisite, the natural period of vibration is so extremely short that even a higher frequency than 50 could be employed without incurring any exaggeration of the stress by resonance.

On the accompanying drawing are shown, as representative examples, contrivances adapted to effect the performance of the above described invention in three specific ways, the nature of the straining actions and their variations being those which most commonly occur in constructions subject to repeated loads. The method of testing, particularly illustrated and described, will be applicable, with suitable obvious modifications of the construction of the apparatus, to testing material which is subjected to other kinds of straining actions and other degrees of variation of their intensity as for example, shearing and torsion and compression alternated with tension. Moreover the precision of the instant at which the maximum stress occurs, under the above described system of operation, and the absence of all lateral constraint of the armature to which longitudinal force is applied, renders the method particularly available for throwing light on the effect of the application of compound stresses to material; for a specimen could in a suitably constructed machine easily be simultaneously subjected to repeated stresses in directions at right angles to each other.

The method of testing may be that in which the number of repetitions to effect destruction is directly ascertained or, alternatively, a plurality of like test pieces may be subjected to a repeated stress a number of times which differ in each specimen and the effect of the repeated stress determined by observing differences in the behavior of the specimens when they are subsequently tested in the ordinary way.

In the drawing:—Figures 1 and 2 are two views, taken at right angles to one another, of a machine for subjecting a test piece to a rapid succession of tensile stresses alternated with zero stress. Fig. 3 shows a modified construction whereby a test piece can be subjected to a repeated bending stress in one direction alternated with zero stress, and Fig. 4 shows a further modification whereby a bending stress in one direction is alternated by a bending stress in the contrary direction.

Referring to Figs. 1 and 2, $a$ is the yoke and $b\ b$ are the polar limbs of a magnet built up of laminated iron plates. The polar limbs $b\ b$ are surrounded by the exciting coils $c\ c$. The electro-magnet $a\ b\ b$ is secured to a cross-head $d$ by means of plates $e\ e$ which plates serve also as guides for the armature $f$ of the electro-magnet, which armature is also built up of laminated iron plates. The test piece $g$ to which the tensile stress is to be applied is secured at one end to the cross-head $d$ and at the other end it is secured to the armature $f$ by a pair of cheek-plates $h\ h$ having interposed distance-pieces $h^1\ h^1$ bolted together and to the cheek-plates by the bolts $h^2\ h^2$.

In order to subject a test-piece $i$ to repeated bending in one direction it is inserted in the machine transversely as shown in Fig. 3 and supported on two bearing-blocks $k\ k$ which are secured between the before-mentioned plates $e\ e$ by cross-bolts $m$. The load is applied to the center of the length of the test-piece by a block $n$ which is inserted between and bolted to the before-mentioned cheek-plates $h\ h$ by the bolts $h^2\ h^2$. The electro-magnet $a\ b\ b$, exciting coils $c\ c$ and armature $f$ are denoted as in Figs. 1 and 2. Fig. 4 shows how the test-piece $i$ is subjected to bending in alternatively opposite directions. For this purpose the electro-magnet, exciting coils and armature are provided in duplicate as indicated by $a^1\ b^1\ b^1,\ c^1\ c^1,\ f^1$ and $b^2\ b^2,\ c^2\ c^2,\ f^2$. The bearing-blocks to support the test-piece at each of its two ends are also duplicated as indicated by $k^1\ k^1,\ k^2\ k^2$. So also is the loading block as indicated by $n^1\ n^2$, both blocks being secured between cheek plates which unite the two armatures.

In either case the test-piece is so attached to the armature that the latter can move only through the very small distance corresponding to the strain produced by the tensional or other stress imposed on the test-piece. The interpolar space between the armature and magnet may therefore be made very small. It should be made only sufficient to avoid actual contact of the armature with the poles of the magnet in order to reduce to a minimum the strength of the exciting current required to produce that particular degree of magnetic induction which is required to generate the desired magnetic attractive force. This force is proportional to the square of the induction, and since the induction at a given frequency is proportional to the self-induced E. M. F. and since also the E. M. F. required to overcome ohmic resistance is small and in quadrature with the E. M. F. of self-induction, it follows that the E. M. F. of self-induction is very nearly equal to the terminal E. M. F. and that therefore the square of the E. M. F. supplied to the winding of the magnet is proportional to the stress produced. The apparatus may therefore be calibrated for a particular frequency and wave form of the impressed E. M. F. by observing corresponding values of E. M. F. and the force required, (measured by dead weight or spring balance), to tear off the armature from the poles, a sheet of fiber of equal thickness to the normal interpolar air-space having been previously inserted. If the E. M. F. wave has approximately sine form the crest value of the attractive force is twice the measured, or average, value. If the wave form is irregular, the crest value of the attractive force can be determined from an oscillogram in the manner well known to electrical engineers.

A slight difference in the thickness of the interpolar space will not affect the relation between E. M. F. and attractive force, it only affects the strength of the exciting current. The indication of the voltmeter may therefore be used as an indication of the stress impressed on the sample. At a given frequency the square of the voltmeter reading multiplied by a constant previously determined by the calibration here explained gives the stress, and by suitably graduating the scale of the voltmeter the stress impressed on the test-piece may be read off directly from the face of this instrument.

When it is desired to subject a test-piece to stresses which are alternately of opposite characters as indicated in Fig. 4, the two armatures are rigidly connected and exert a force in one direction or the other according to which of the magnets is excited. By exciting the magnets with currents having a phase difference of a quarter period the magnet on one side will exert its maximum of attractive force at the time when the other is inert and vice-versa. The two armatures rigidly connected to each other are thus alternately forced in opposite directions and the test-piece is acted on by stresses alternately of opposite character.

The currents required to energize the apparatus may be taken from any convenient source of supply, provided that wave form, E. M. F. and frequency retain the values which they had when the apparatus was calibrated. Where this condition is not fulfilled I employ a special two-phase alternator driven at approximately constant speed by any convenient means, and I regulate the stress by adjusting the excitation of the alternator. This may be done by a series or shunt rheostat in a manner well known to electrical engineers. In this case a small change of speed does not result in a change of induction because the E. M. F. produced by the alternator and the self-induced E. M. F. of the magnets follow the same law of proportionality with the speed; hence the stress impressed upon the test piece is dependent only on the excitation of the alternator and is almost independent of its speed. I attach a revolution counter to the shaft of the alternator and by this means I determine the total number of stresses which have been impressed on the test-piece in any given time that the apparatus has been at work.

The double magnet apparatus may also be used for the production of stresses in one direction only; if this is desired no other alteration is required than the switching off of one of the magnet circuits.

I claim:

1. A contrivance whereby the material of a test-piece may be subjected to a rapid succession of repeated stresses comprising an electro-magnet, the armature thereof, means for energizing the electro-magnet by an alternating electric current and means for securing a test-piece to both the armature and the electro-magnet.

2. A contrivance whereby the material of a test-piece may be subjected to a rapid succession of repeated stresses comprising an electro-magnet, the armature thereof, means for energizing the electro-magnet by an alternating electric current, and means for securing a test-piece to both the armature and the electro-magnet so that the strain of the test-piece is equal to the displacement of the armature relative to the electro-magnet.

3. A machine whereby the material of a test-piece may be subjected to a rapid succession of repeated stresses by a load applied in alternately opposite directions, comprising two electro-magnets, the armatures thereof, means for securing one portion of the test-piece to the electro-magnets and another portion to the armatures, and means for energizing the electro-magnets by alternating electric currents.

In testimony whereof I have signed my name to this specification in the presence of two subscribing witnesses.

GISBERT KAPP.

Witnesses:
EDGAR J. KIPPS,
THOS. F. WALL.